Dec. 16, 1969 S. SKALKA 3,484,145

ENCLOSED ROTARY STORAGE CABINET

Filed Feb. 3, 1966

3,484,145
ENCLOSED ROTARY STORAGE CABINET
Stanley Skalka, Bladensburg, Md., assignor to Victor Stanley, Inc., Hyattsville, Md.
Filed Feb. 3, 1966, Ser. No. 524,777
Int. Cl. A47b *49/00, 81/06*
U.S. Cl. 312—11 10 Claims

ABSTRACT OF THE DISCLOSURE

An enclosed storage cabinet particularly for storing long-playing record albums. The cabinet is provided with a front door which pivots about a vertical axis. The front door supports a shelf. The shelf supports dividers which hold the record albums in a radial manner on the shelf. When the front door is pivoted to an open position, the record albums can be made available for easy selection. When the front door is pivoted to a closed position, the record albums are protected within the walls of the cabinet.

This invention relates to a rotary storage cabinet and more particularly to a rotary storage cabinet which is totally enclosed and is adapted to conveniently store approximately 75 long playing record albums.

An object of this invention is to provide an attractive piece of furniture which functions to store record albums in a minimum amount of space in such a way that one can easily select his favorite record album.

Another object of this invention is to provide a cabinet structure that provides for record storage and may also include necessary components for a high fidelity phonograph system for playing the long playing records.

In the past, long playing record albums were placed in enclosed cabinets one album against the other like books. Since the album covers are concealed when stored in this manner, the fastidious collector found it difficult to select his favorite album.

This invention permits one to rotate a shelf which supports the record albums in a radial manner. The rotating shelf normally is completely enclosed by cabinet structure, but rotating it 180 degress brings the record albums into view for easy selection.

Specifically, this invention has a horizontal shelf and wire divider means supported above it. The wire dividers are fixed in a radially disposed manner in order to support the record albums radially. The albums are therefore spaced further apart at their outer edges and thereby allowing the selector to view the album cover for quick selection. Also, a semi-circular means is located between the divider means and the front door. It aids as a stop for the inner edges of the album covers thereby keeping the albums in a uniform radial position.

Figure 1:
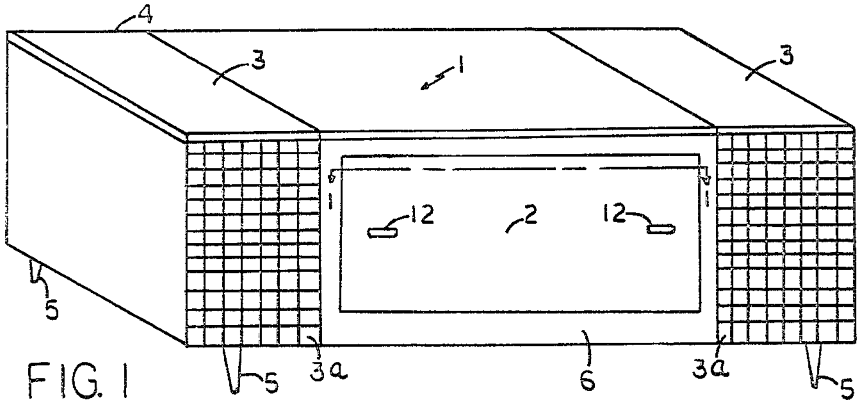
FIGURE 1 is a perspective view of the cabinet structure of the invention.

FIGURE 1 shows the cabinet 1 encompassing a rotating door 2. Doors 3 are attached by hinges to the back wall of cabinet 1. This permits doors 3 to be raised to allow one to reach the components of the phonograph. The entire cabinet is supported by legs 5. The front wall having speaker enclosures *3a* adjacent the side walls of the cabinet.

Figures 2, 6:
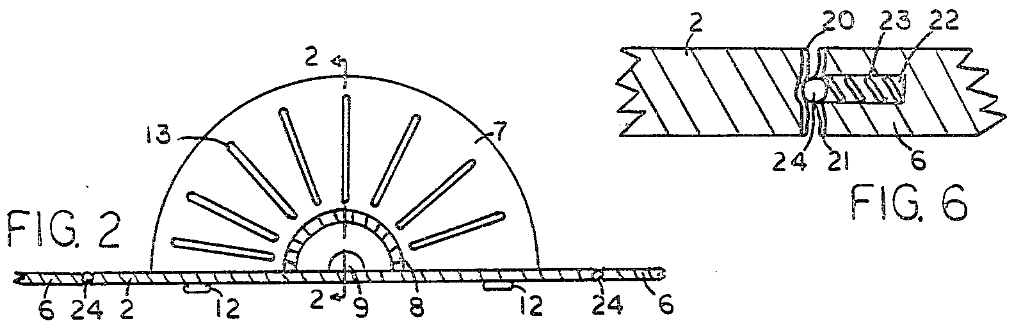
FIGURE 2 is a horizontal sectional view of the rotary shelf supported in the center portion of the cabinet structure of FIGURE 1 designated by section 1—1.
FIGURE 6 shows a latch means which holds the door in alignment with the front wall.

FIGURE 2 shows door 2 in alignment with the front wall 6 of cabinet 1. Semi-circular shelf 7 is secured normal to door 2. Semi-circular tube 8 lies adjacent to door 2 at its midpoint and rests on shelf 7. Inside tube 8 and shaft 9 is secured along the vertical axis of the inside surface of door 2. The shaft 9 extends above and below the upper and lower edges of door 2. The ends of shaft 9 project into members 10 housing snug openings which act as bearing means. The outside surface of door 2 carries handles 12. By pushing one handle and pulling the other simultaneously, shelf 7 can be rotated about shaft 9 and thereby bringing shelf 7 and the record albums into view. The upper surface of shelf 7 supports a plurality of curved divider rods 13. Steel divider rods 13 are radially spaced on shelf 7. Curved rods 13 have parallel free ends 14 embedded into holes 15 and are frictionally held herein. The bight 16 of the curved rods 13 is substantially V-shaped and extends upwardly from shelf 7 for more than half the height of door 2.

Figure 4:
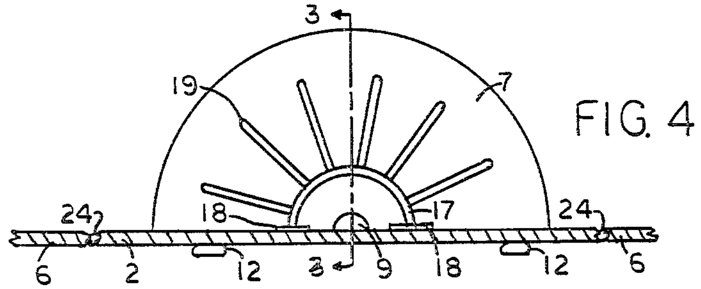
FIGURE 4 is a horizontal sectional view of another embodiment of the rotary shelf designated by section 1—1.
Figure 3:
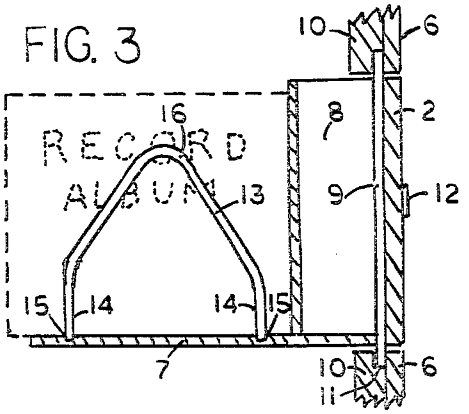
FIGURE 3 is a vertical sectional view of the rotary shelf designated by section 2—2 shown in FIGURE 2.
Figure 5:
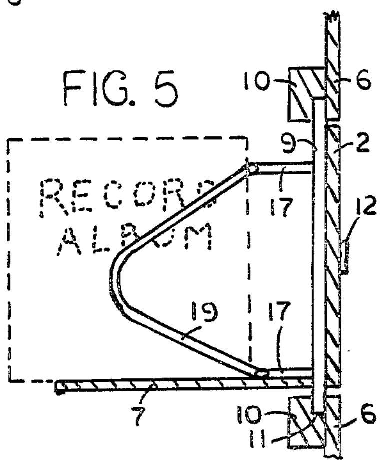
FIGURE 5 is a vertical sectional view of the rotary shelf designated by section 3—3 shown in FIGURE 4.

In another embodiment of the rotary shelf structure shown in FIGURES 4 and 5, the rod arrangement is secured to the inside surface of door 2. Semi-circular rings 17 have flanges 13 secured to their free ends. These flanges are in turn attached to door 2. Rings 17 provide a support for curved rods 19 which are radially spaced about rings 17. Curved rods 19 extend outwardly from rings 17 for more than half the length of shelf 7. Lower ring 17 rests on shelf 7 and upper ring 17 is fixed to door 2 below the upper edges of the record albums. This enables rings 17 to act as an inner rest means for the albums.

FIGURE 6 shows a latch means which keeps door 2 in alignment with front wall 6. The vertical edges of door 2 at their midpoints each carry a flange 20. Flange 20 at its center is provided with a concave opening in the form of a hemisphere. Another flange 21 is provided at its center with a convex opening. The inside surface of flange 21 covers a bored opening 22. The bored opening 22 houses a spring 23 which forces a ball 29 against the inner surface of flange 21 at the convex opening. The ball 24 is adapted to project partially through the center opening in flange 21 and engage concave opening in flange 20 thereby forming an alignment means for door 2.

What I claim is:

1. A movable record storage compartment for a cabinet or the like comprising a panel having a normally exposed side and an unexposed side, means adapted to support said panel for rotational movement with respect to said cabinet or the like, shelf means secured to said unexposed side and extending substantially normal thereto, generally arcuate bearing surface means positioned on said unexposed side extending substantially the length thereof and substantially normal to said shelf means, a plurality of spaced openings provided in said shelf means in a row concentric with said bearing surface means and adjacent thereto, a second plurality of spaced openings provided in said shelf means in a row concentric with said bearing surface means and said first row, each of said openings in said second row being substantially radially aligned with an opening in said first row respectively, a plurality of individual divider means comprising curved rods of substantial height having their free ends anchored in respective pairs of said radially aligned openings whereby the shelf is divided into a plurality of wedge-shaped sectors which serve to receive and segment a plurality of records in a compact accessible fashion therebetween with the inner parts thereof being wedged against said bearing surface means by the cooperating action of the adjacent legs of said curved rods disposed in said first-mentioned row.

2. The device as defined in claim 1, wherein the curved rods extend upwardly for substantially half the height of the panel and door.

3. The movable record storage compartment of claim 1 wherein the divider means are substantially V-shaped.

4. The movable record storage compartment of claim 1 wherein the exposed side of the panel is provided with means to facilitate rotational movement thereof.

5. The movable record storage compartment of claim 1 wherein means are provided for locking the panel in an open or closed position with respect to said cabinet.

6. A movable record storage compartment for a cabinet or the like comprising a panel having a normally exposed side and an unexposed side, means adapted to support said panel for rotational movement with respect to said cabinet or the like, shelf means secured to said unexposed side and extending substantially normal thereto, generally arcuate bearing surface means positioned on said unexposed side and including at least two spaced ring portions each being substantially parallel with respect to said shelf means, a plurality of individually spaced divider means positioned outwardly with respect to said bearing means to receive and segment said records by supporting the same therebetween with a portion thereof engaging said bearing surface to thereby arrange the same on said shelf in a compact accessible fashion, said divider means comprising individual curved rods having each of their free ends respectively securely fixed to one of said ring portions to thereby position the bight portion of the curved rods radially outwardly therefrom whereby the shelf is divided into a plurality of wedge-shaped sectors which serve to receive and segment a plurality of records in a compact accessible fashion therebetween with the inner parts thereof being wedged against said bearing surface means by the cooperating action of the adjacent ends of said curved rods.

7. The movable record storage compartment of claim 6 wherein the exposed side of the panel is provided with means to facilitate rotational movement thereof.

8. The movable record storage compartment of claim 6 wherein means are provided for locking the panel in an open or closed position with respect to said cabinet.

9. The movable record storage compartment of claim 6 wherein the bight portion of the curved rods extend outwardly for a substantial portion of the shelf means.

10. A divider means for segmenting records or the like positioned on a platform comprised of two vertically spaced substantially parallel ring portions, means for securing said ring portions to a support, a plurality of divider means comprising individual radially spaced curved rods having their free ends connected to each of said ring portions with the bight of each rod extending outwardly whereby the platform is divided into a plurality of wedge-shaped sectors which serve to receive and segment a plurality of records in a compact accessible fashion therebetween with the inner parts thereof being wedged against said ring portions by the cooperating action of the adjacent ends of said curved rods.

References Cited

UNITED STATES PATENTS

| | | | |
|---|---|---|---|
| 724,870 | 4/1903 | Hullhorst | 312—329 |
| 1,757,807 | 5/1930 | Mack | 312—329 |
| 2,238,451 | 4/1941 | Roth | 211—40 |
| 2,441,575 | 5/1948 | Johnson | 312—22 XR |
| 2,562,112 | 7/1951 | Minardi | 312—11 |
| 2,581,547 | 1/1952 | Martini | 312—11 |
| 2,915,354 | 12/1959 | Lodige et al. | 312—329 XR |
| 3,341,266 | 9/1967 | Schecter et al. | 211—40 XR |

FOREIGN PATENTS

| | | |
|---|---|---|
| 867,405 | 5/1961 | Great Britain. |

CASMIR A. NUNBERG, Primary Examiner

U.S. Cl. X.R.

211—40; 312—183, 197, 329